United States Patent
Kurokawa et al.

[11] Patent Number: 5,835,939
[45] Date of Patent: Nov. 10, 1998

[54] DATA TRANSFER CONTROL METHOD AND APPARATUS FOR EXTERNAL STORAGE SUBSYSTEM ADAPTED TO PERFORM ERASING AFTER WRITING

[75] Inventors: Isamu Kurokawa; Hisaharu Takeuchi, both of Odawara; Masahiro Kawaguchi, Hiratsuka; Hisayoshi Kawabata; Hiroaki Onuma, both of Odawara, all of Japan

[73] Assignee: Hitachi, Ltd., Tokyo, Japan

[21] Appl. No.: 630,999

[22] Filed: Apr. 12, 1996

[30] Foreign Application Priority Data

Apr. 13, 1995 [JP] Japan ................................. 7-088475

[51] Int. Cl.[6] .............................. G06F 12/00; G06F 13/00
[52] U.S. Cl. ........................... 711/113; 711/112; 711/114; 711/118; 711/154
[58] Field of Search ...................... 364/DIG. 1; 395/439, 395/440, 441, 182.05, 445, 182.04; 711/112, 113, 114, 118, 154

[56] References Cited

U.S. PATENT DOCUMENTS

| | | | |
|---|---|---|---|
| 4,780,808 | 10/1988 | Moreno et al. | 395/427 |
| 4,814,904 | 3/1989 | Shigihara et al. | 360/60 |
| 5,307,473 | 4/1994 | Tsuboi et al. | 395/427 |
| 5,390,186 | 2/1995 | Murata et al. | 371/10.1 |
| 5,396,620 | 3/1995 | Burghart et al. | 395/575 |
| 5,418,929 | 5/1995 | Tsuboi et al. | 395/427 |
| 5,497,472 | 3/1996 | Yamamoto et al. | 395/427 |
| 5,515,500 | 5/1996 | Mizuno et al. | 395/182.05 |
| 5,530,829 | 6/1996 | Beardsley et al. | 395/440 |
| 5,568,628 | 10/1996 | Satoh et al. | 394/440 |
| 5,590,311 | 12/1996 | Matsushima | 395/500 |

FOREIGN PATENT DOCUMENTS

| | | |
|---|---|---|
| 0559142A2 | 9/1993 | European Pat. Off. . |
| 02079266 | 3/1990 | Japan . |
| 6-180671 | 6/1994 | Japan . |

*Primary Examiner*—Tod R. Swann
*Assistant Examiner*—Tuan V. Thai
*Attorney, Agent, or Firm*—Antonelli, Terry, Stout & Kraus, LLP

[57] ABSTRACT

In control method and apparatus for data transfer in an external storage subsystem, a disk unit and a control unit interposed between a host channel and a processing unit are provided and data in a variable record length supplied from the host is converted to data in a fixed record length to write it in the disk unit. Final format writing end position information for a logical track and an erase flag indicating whether the erasing is required or not are stored at a portion of a logical track control table which controls a cache memory, for each logical track. In the format writing on the cache memory, the final format writing end position information and the erase flag are updated, and when the data is written into the disk unit from the cache memory by logical track unit, the erase flag is referred and the erasing is performed if it is required. Thus, the area of erasing and the number of times of execution are minimized and the throughput of the data transfer between the processing unit and the rotating storage device is improved.

13 Claims, 7 Drawing Sheets

DATA TRANSFER CONTROL METHOD AND APPARATUS FOR EXTERNAL STORAGE SUBSYSTEM ADAPTED TO PERFORM ERASING AFTER WRITING

BACKGROUND OF THE INVENTION

Field of the Invention

The present invention relates to control technique and control apparatus for an external storage subsystem, and more particularly to data transfer method and apparatus for an external storage subsystem which is suitable for converting data in a variable record length format to data in a fixed record length format for storage in a rotating storage device.

The term rotating storage device refers to a storage device which writes and reads information to and from a storage medium (e.g. floppy disk, hard disk or CD-ROM) having recording tracks spirally formed thereon.

In general, a disk storage device for recording data in the variable record length format needs format writing to write control information on a track of a disk when new data is to be written on the track having data previously written thereon.

The term format writing is referred to writing or updating count field information of information, key and data on CKD (count key data) format.

After the format writing, erasing to erase previously written data (up to the end of the track) is conducted by a command from a control unit. In the erasing, erase data (having a value 0) is actually written onto the track. In this manner, the previously written data is invalidated so that the disk unit and the control unit may recognize, by reading the erase data, that there is no valid data in the track area after the format writing.

On the other hand, if the erase data is not written, the previously written control information, that is, the count field information remains and the data corresponding to the remaining count field information may be erroneously recognized as the valid data.

The above data is divided into record units (records) on the track and each record is assigned with a serial number. When data is to be written into the disk unit through a cache memory, the data writing procedure is same as that described above.

In the prior art, the erasing after the format writing is conducted immediately after the format writing. Thus, when the format writing is to be conducted to record a new record on a track for which the erasing has once been conducted after the format writing, the erasing is conducted again immediately after the format writing for the previously erased area.

Thus, the erasing is conducted continuously for the same area of the same track and the second erasing is wasteful and the process time is wasted. An approach to solve this problem is disclosed in JP-A-61-241824. In JP-A-61-241824, a table for recording information on the erasing after the format writing for each track of the disk unit is provided in a memory in the disk unit and the table is dynamically referred in the format writing to the track to determine whether the erasing has already been conducted for that track. When it is determined that the erasing has already been conducted, only the format writing is conducted and the erasing is not. On the other hand, if it is determined that it has not been conducted, the erasing is conducted after the format writing. In this manner, unnecessary erasing of the erasing which was conducted at every end of the format writing in the past is eliminated and efficient format writing is attained.

As an improvement over the technology of JP-A-61-241824, a technology disclosed in JP-A-2-79266 is known. In JP-A-2-79266, a non-volatile memory for storing location information indicating a valid record area of a record for individual track in the disk unit is provided, and after the format writing to initialize the track, the area for which the format writing has been conducted is removed from the valid area and only the valid record area of the record of the track is stored in the memory. In this manner, the erasing to invalidate the remaining area of the track other than the valid record area of the track is made unnecessary. Namely, by referring the location information indicating the valid record area in the memory, it may be determined that there is no valid data in the track area after the format writing so that the erasing after the format writing is not necessary. Accordingly, it is not necessary for the disk unit or the control unit to recognize the valid data area based on the erase data recorded on the track.

The prior art references (1) and (2) mentioned above may eliminate unnecessary erasing. In the above prior art, assume that the control unit is connected to a commercially available disk unit (for example, a commercially available SCSI disk drive unit). The SCSI disk drive unit records data in the fixed record length format. On the other hand, the processing unit transfers data in the variable record length format. Accordingly, when the processing unit is connected to a plurality of disk units (for example, a plurality of SCSI disk drive units) and a system (disk array system) for storing a logical track in the same logical drive which the processing unit may recognize is distributedly stored in a plurality of disk units which record data in the fixed record length format is adopted, it is not possible to provide the control table for storing the location information of the references (1) and (2) in the memory in the disk unit. This is because the logical drive and the logical track recognized by the processing unit which transfers the data in the variable record length format and the physical track in the disk unit (physical drive) which record data in the fixed record length format are not the same.

If the control table for storing the location information is to be absolutely provided in the disk unit, an area for storing the location information may be provided on the medium in the disk unit. In this case, before accessing each data area, the location information on the medium has to be first referred to recognize whether it is in the valid data area in the data area and then only the data in the valid area may be accessed. However, in such a series of processes, it is necessary to refer the location information on the track medium in order to access the target data in the data area. Namely, in order to access the target data area, the positioning of a head onto the medium (disk) is needed twice. Considering the rotation of the disk, positioning the head twice results in the increase of the rotation waiting time, which raises a serious performance problem. As a result, the approach to provide the control table for storing the location information in the disk unit has to be avoided.

When the control table is provided in the control unit rather than in the disk unit, the control information of all of the logical tracks storable in all disk units connected to the control unit is to be stored in the table. However, the control information of all logical tracks is very large in volume and the capacity of the control table increases and semiconductor memories for the control table for storing the control information in the control unit need be expanded.

For those reasons, if the control table for storing the location information for each track cannot be provided in the disk unit or the control unit, it is not possible to implement the teaching of JP-A-2-79266 to eliminate the erasing for invalidating the remaining area of the track.

If it is the case, it is necessary for the disk unit and the control unit to recognize that there is no valid data in the track area after the format writing based on the erase data as it was in the prior art. Namely, after the format writing, the erasing of the track in the disk unit is required at least once. In this case, the smaller the area invalidated in one erasing, the less the transfer of the wasteful erase data and the higher the efficiency.

It is an object of the present invention to provide control method and apparatus for an external storage subsystem which solve the problems encountered in the prior art.

It is another object of the present invention to provide control method and apparatus for the external storage subsystem which can improve throughput of data transfer between a processing unit and a rotating storage device by minimizing an area of erasing and the number of times of execution.

It is another object of the present invention to provide control method and apparatus for the external storage subsystem which can improve the throughput of the data transfer between the processing unit and the rotating storage device by minimizing the area of erasing and the number of times of execution without sacrificing the reliability of data and operation.

It is a further object of the present invention to provide control method and apparatus for the external storage subsystem which can improve the throughput of the data transfer between the processing unit and the rotating storage device by minimizing the area of erasing and the number of times of execution with less resources.

In accordance with the present invention, in order to achieve the above objects, (1) control information on only the data accompanied with the format writing (format writing data) written on a logical track on a cache memory into a memory (control table) of a control unit and an end position of the format writing data in the logical track on the cache memory is stored as the control information, and (2) when data is read from the cache memory and written into the rotating storage device (disk unit), the erasing is selectively conducted based on the control information.

Thus, in accordance with the feature (1), since the control information on only the format writing data written on the logical track on the cache memory is stored in the control table of the control unit, the capacity of the control table may be small.

In accordance with the features (1) and (2), when the data is read from the cache memory and written into the rotating storage device (disk unit), whether the erasing is required or not is determined based on the control information, and the erasing is conducted only when it is required (when the end position of the format writing data in the logical track on the cache memory is different from the end of the logical track). Thus, the number of times of execution of the erasing is suppressed to a minimum required.

Preferably, each time new write data is written into the logical track on the cache memory, the end position of the write data in the logical track is compared with the end position of the logical track, and if the end positions are different, a flag indicating that the erasing is necessary is set in the control table in the control unit and when the data is read from the logical track of the cache memory and written into the rotating storage device (disk unit), the flag corresponding to the logical track is referred to determine whether the erasing is necessary or not, and if the erasing is necessary, the erasing is conducted.

According to an aspect of the present invention, there is provided a method for controlling data transfer in an external storage subsystem comprising a rotating storage device and a control unit provided between said rotating storage device and a host processing unit, said control unit including a cache memory for temporarily holding data transmitted and received between said processing unit and said rotating storage device, said cache memory having a memory area in a form of a plurality of logical tracks corresponding to logical tracks of said rotating storage device, said method comprising the steps of: a) writing write data transferred from said processing unit and to be transferred to said rotating storage device to one logical track of said logical tracks of said cache memory corresponding to the write data; b) for each of the logical tracks of the cache memory having the write data written thereon, storing an end position of valid write data in the logical track to a control memory in said control unit; c) in reading the write data from one of the logical tracks of said cache memory, referring the end position of the valid write data in one of the logical tracks in said control memory, reading the data from the top position to the end position of the valid write data in one of the logical tracks and transferring the data to said rotating storage device; and d) transferring specified data of the volume equal to the data from the position immediately after the end position of the valid write data to the end position in one of the logical tracks read in said step c) to said rotating storage device as erase data to perform the erasing.

Preferably, the method for controlling data transfer further comprises the steps of: e) for each of the logical tracks of said cache memory having the write data written thereon, setting a flag indicating whether the erasing of said step d) is required or not in transferring the write data read from each of said logical tracks to said rotating storage device in said control memory based on the end position of the valid write data in each logical track and the end position in each logical track; and f) in reading the write data from one of the logical tracks of said cache memory, referring the flag of said control memory corresponding to the one logical track of said cache memory and performing said step d) when the referred flag indicates that the erasing of said step d) is required.

Preferably, in the method for controlling data transfer, said step e) sets a flag indicating that the erasing is required or not required in reading the write data in each of the logical tracks when the end position of the valid write data in each logical track and the end position of each logical track match or mismatch, respectively.

Preferably, the method for controlling data transfer further comprises a step of when an access request requesting updating or reading of data for the data of one of logical tracks of said cache memory is issued from said processing unit to said cache memory, granting the access request only when the position of the data to be accessed in the one logical track designated by the access request is located toward the top of the one logical track relative to the end position of the valid write data in the one logical track of said cache memory.

In accordance with one embodiment of the present invention, the final format writing end position information and the flag indicating whether the erasing is necessary or not are stored in the control table for controlling the logical track on the cache memory in the control unit and when the logical track is read from the cache memory and written into the disk unit, the final format writing end position information and the flag indicating whether the erasing is necessary or not are referred to determine the erasing is to be conducted for the area immediately following to the final format writing end position in the logical track, and the erasing is conducted only when it is necessary.

When an access request such as the updating of the write data or the reading of the data which does not need the format writing is issued from a host processor to the data in the logical track on the cache memory, the position information in the logical track designated by the access request is compared with the final format writing end position information stored in the control table of the control unit. Depending on the comparison, the grant/non-grant of the access request, that is, the valid data area in the logical track is determined.

The control table is of minimum required capacity corresponding to the number of logical tracks which are in the cache memory and are ready to be written into the disk unit and may be developed into a portion of a semiconductor memory which forms the cache memory or a portion of a semiconductor memory which is independent from the cache memory.

When the data of the logical track is to be written on the cache memory, the logical track may comprise a plurality of control units (blocks) on the cache memory. When new or additional writing to the logical track which requires the updating of the write data or the format writing other than the data reading is made, the block number of the block having the format writing end position sequentially assigned from the top of the logical track is stored in the control table as the final format writing end position information. Thus, the net or valid data area in the logical track may be identified. When the block number as the final format writing end position information is different from the last vacant block number in the logical track, that is, when an unused block is present following to the current final format writing end position, a flag indicating that the erasing is required is set. Accordingly, the erasing to discriminate the invalid area in the logical track is not necessary until the logical track on the cache memory is written into the disk unit, and when the additional or new writing which accompanies with the format writing on the cache memory takes place, only the block number as the final format writing end position information and the flag status need be updated.

When the logical track on the cache memory is written into the disk unit, the flag is referred and only when the erasing is required (when the entire logical track is not filled with the valid data), the erasing is conducted for the invalid area. Accordingly, the erasing is conducted only when the logical track is written into the disk unit and the invalid data area is present in the logical track and the area of the erasing and the number of times of the erasing are suppressed to the minimum required.

For the access request such as the updating or reading of the existing data in the logical track which does not accompany with the format writing, the access request is granted only when the position information (block number) in the logical track designated by the access request is smaller than the block number as the final format writing end position information so that the erroneous reading of the invalid data on the rear side of the logical track or the handling as the data to be updated and written is prevented.

DESCRIPTION OF THE PREFERRED EMBODIMENTS

The preferred embodiments of the present invention are now explained in detail with reference to the accompanying drawings.

Figure 1:
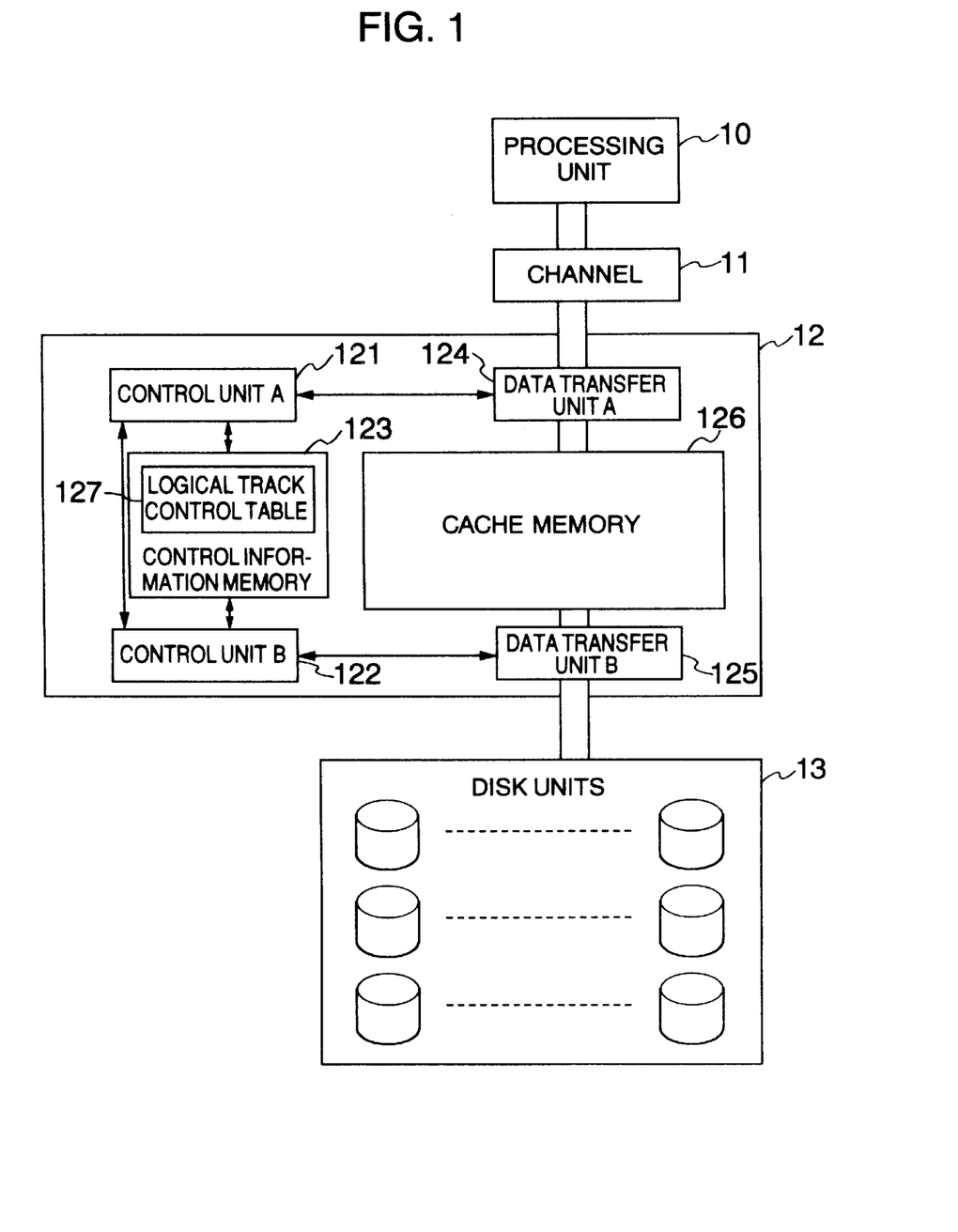
FIG. 1 shows a block diagram of a configuration of a data processing system in accordance with an embodiment of the control method and apparatus for the data transfer of the external storage subsystem of the present invention.
Figure 2:
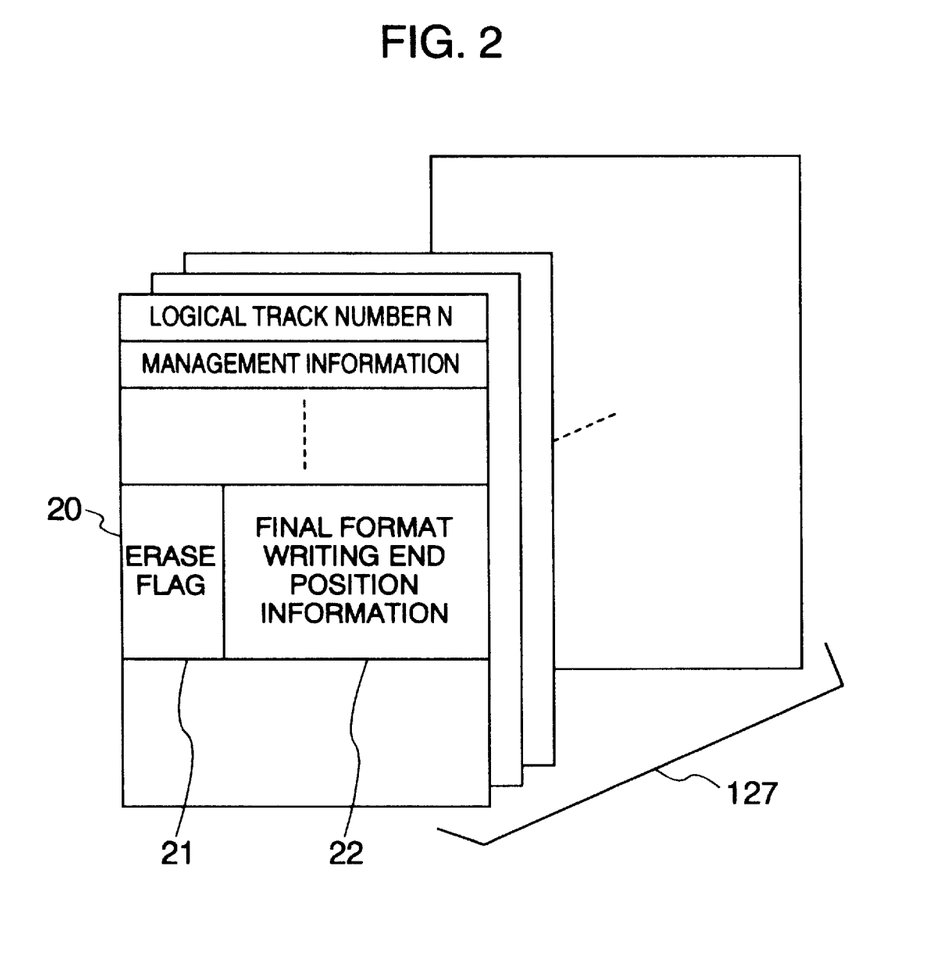
FIG. 2 shows a format of a control information table in the control unit shown in FIG. 1, FIGS. 3A and 3B show relations between variable length data and fixed length data.
Figure 4A:
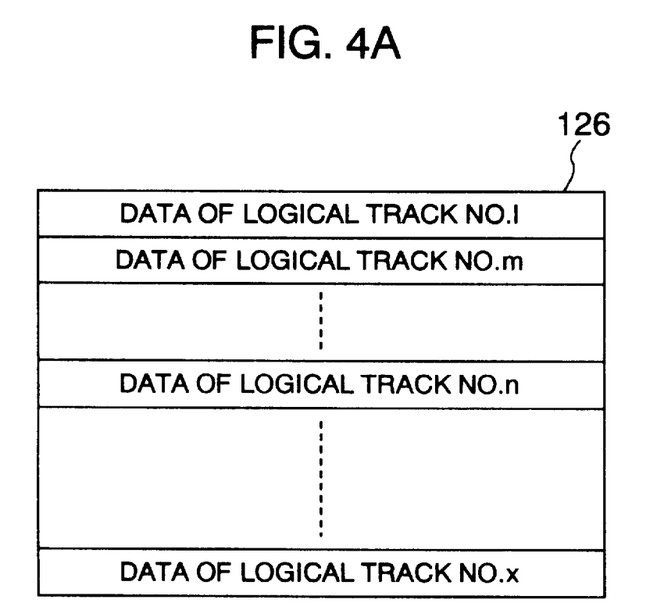
FIGS. 4A and 4B show storage format of data on the cache memory in the control unit shown in FIG. 1.
Figure 4B:
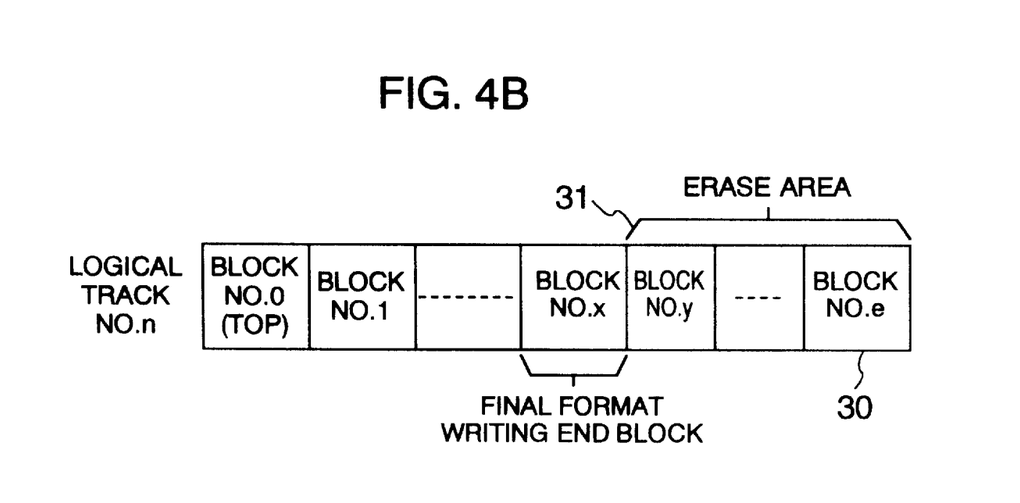
Figure 5:
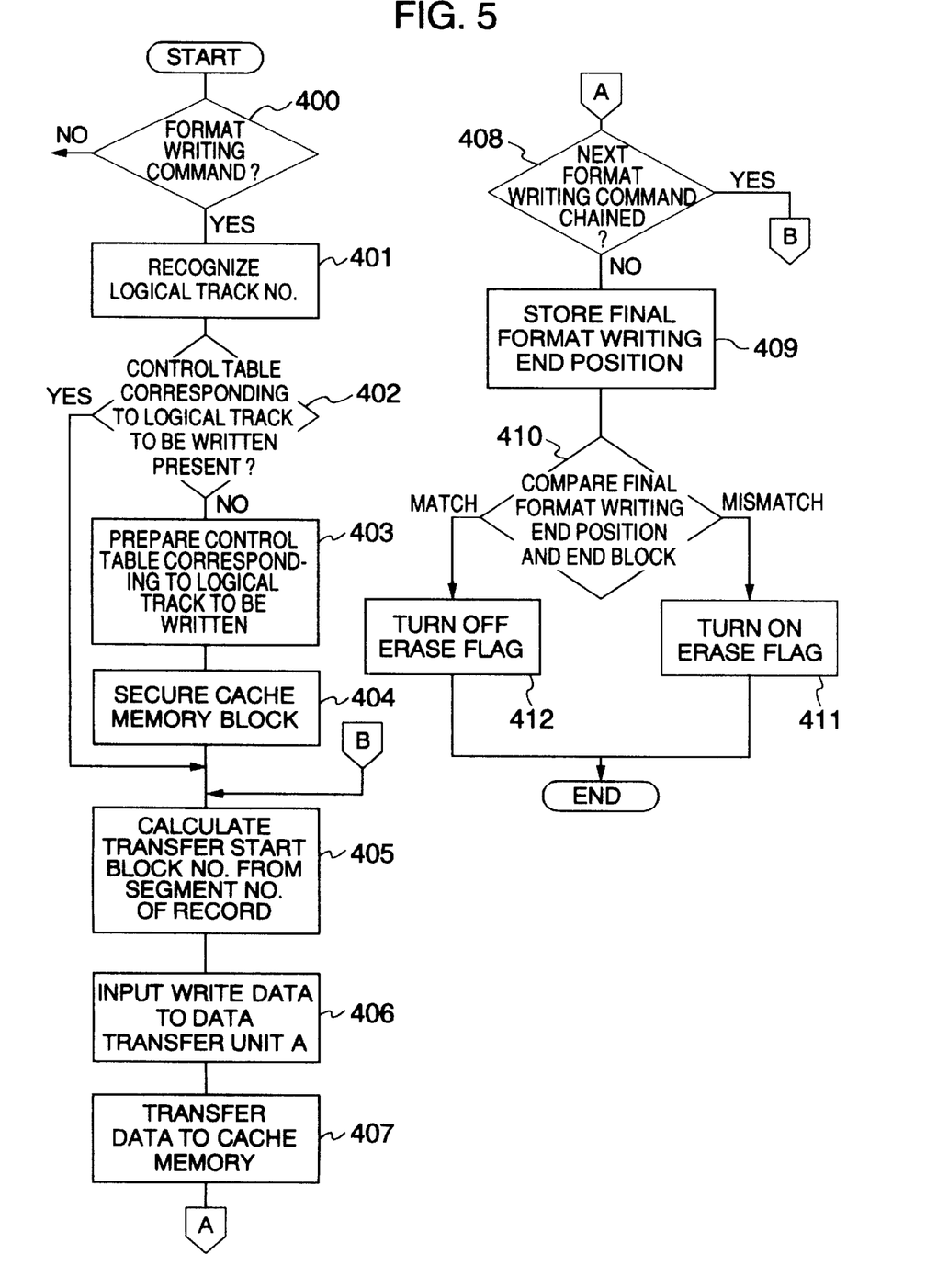
FIG. 5 shows a flow chart to illustrate a format writing process to the cache memory in the embodiment of the control method for the data transfer of the external storage subsystem of the present invention.
Figure 6:
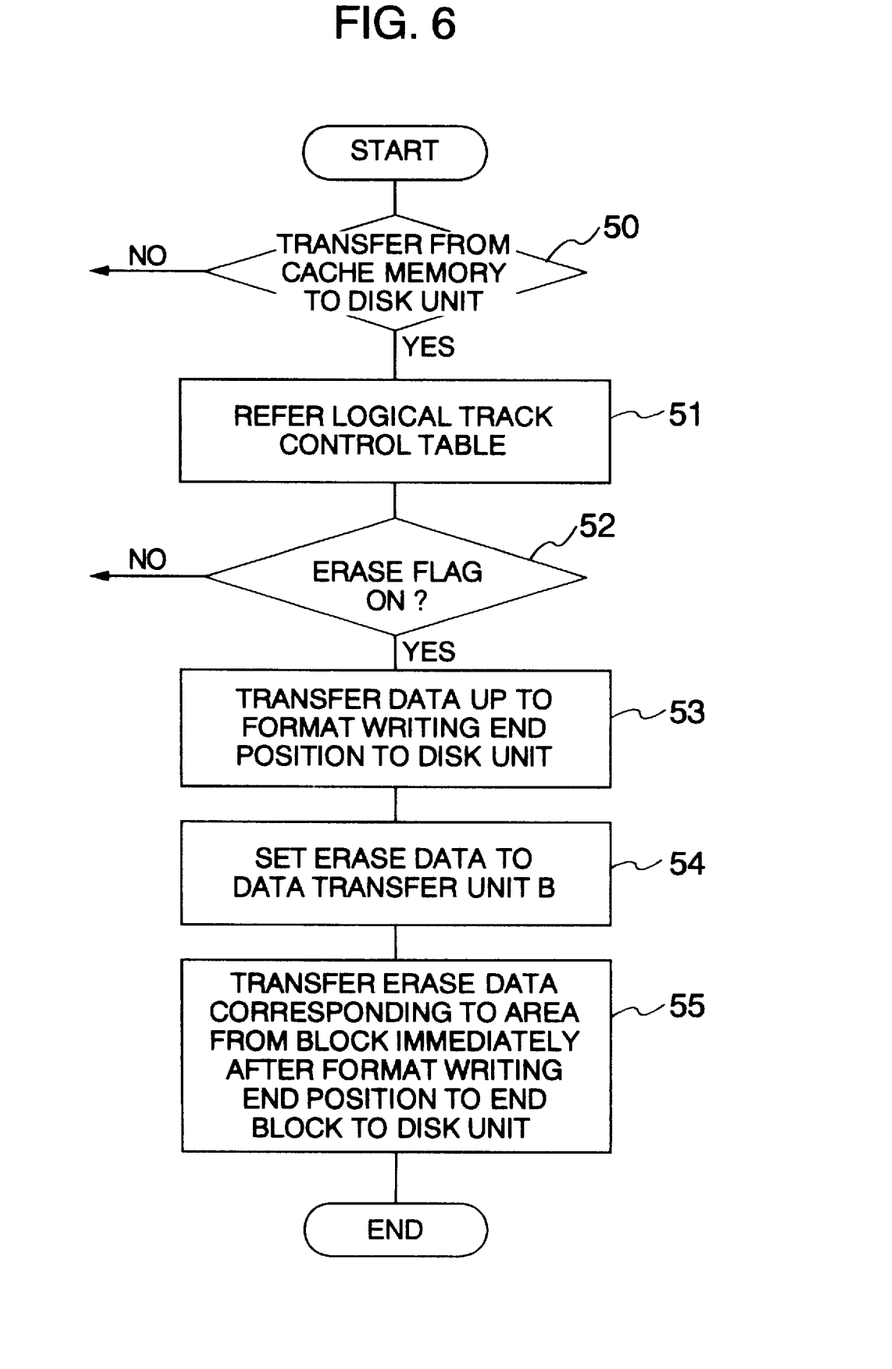
FIG. 6 shows a flow chart to illustrate an erase process in the embodiment of the control method for the data transfer of the external storage subsystem of the present invention.
Figure 7:
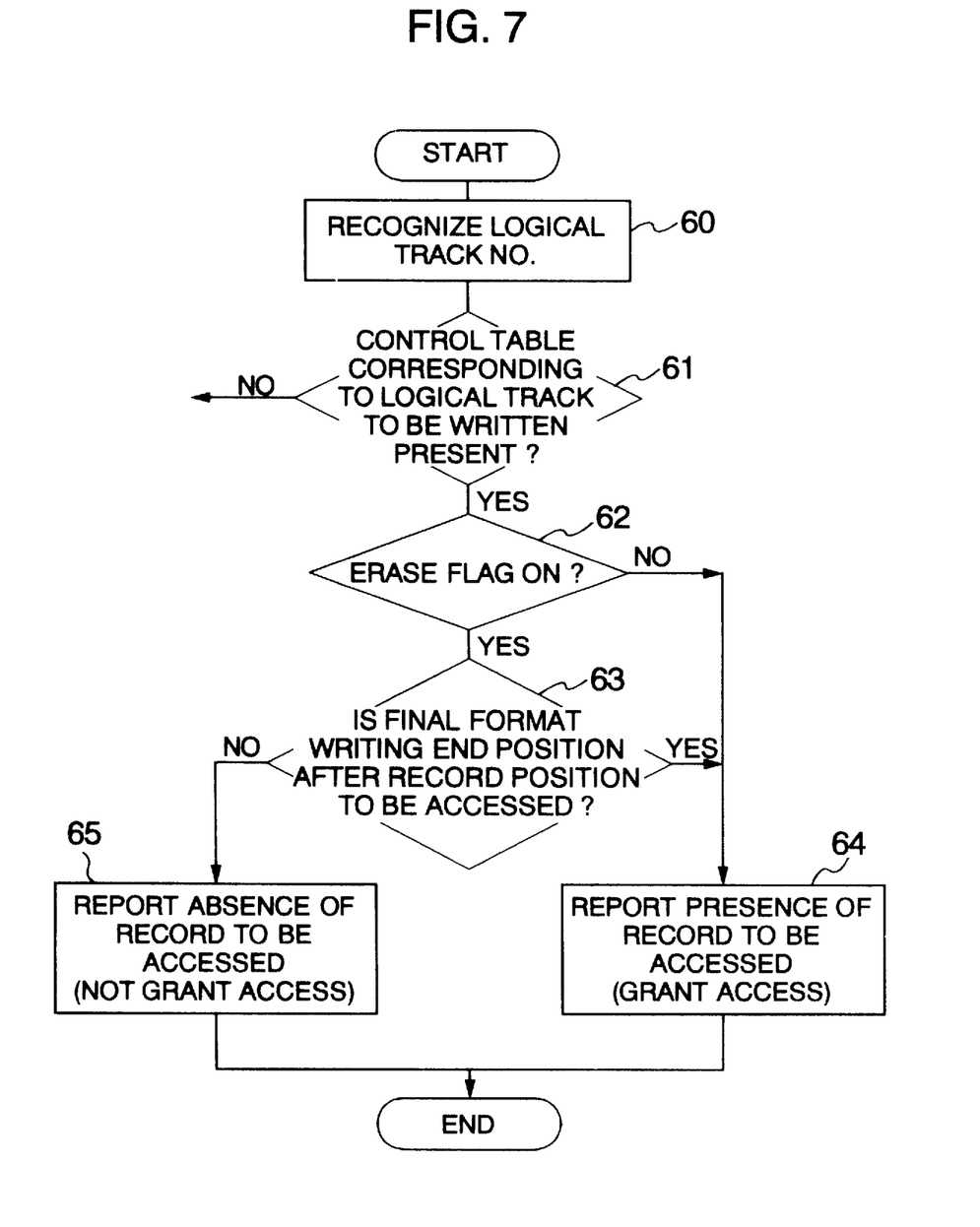
FIG. 7 shows a flow chart to illustrate an access request process in the embodiment of the control method for the data transfer of the external storage subsystem of the present invention.

FIG. 1 shows a block diagram of a configuration of a data processing system to which control method and apparatus for the external storage subsystem in accordance with one embodiment of the present invention are applied, FIG. 2 shows a conceptual view of a format of a control information table in the control unit shown in FIG. 1 and FIGS. 4A and 4B show conceptual views of data storage format on a cache memory in the control unit shown in FIG. 1. FIGS. 5, 6 and 7 show flow charts of the control method for the external storage subsystem in accordance with the present embodiment.

The data processing system shown in FIG. 1 comprises a processing unit 10 for performing operations for information, a channel 11 for performing input/output control such as data transfer, a plurality of disk units (disk array) 13 and a control unit 12 interposed between the disk unit 13 and the channel 11 for controlling the exchange of data and commands. It records data in the disk unit 13 through the channel 11 and the control unit 12 and reproduces data from the disk unit 13 by a command from the processing unit 10. Portions excluding the processing unit in FIG. 1 constitute the external storage subsystem. In the embodiment shown in FIG. 1, the subsystem is directly connected to one processing unit although a similar method may be applied when it is connected to a plurality of processing units.

The data to be recorded and reproduced is recorded by logical track unit when it is recorded to the disk unit 13. The logical track does not always directly correspond a physical track of the disk unit 13. The data is divided into record units called records on the logical track and information indicating a position of its own record on the logical track (hereinafter referred to as a segment number) and a record length are written in a control information field or CKD format count field at the top of each record. The segment number is assigned sequentially from the top of the track to the fractions of logical track.

The control unit 12 of the present embodiment comprises a data transfer unit A 124 for inputting to the control unit 12 and outputting to a host unit the write data transferred from the host unit (or the processing unit) and the read data to be transferred to the host unit, a control unit A 121 for controlling the data transfer between the host unit and the cache memory 126 through the data transfer unit A 124, a data transfer unit B 125 for inputting to a cache memory 126 and outputting to the disk unit 13 the write data transferred from the cache memory 126 to the disk unit 13 and the read data transferred from the disk unit 13 to the cache memory 126, a control unit B 122 for controlling the data transfer between the cache memory 126 and the disk unit 13 through the data transfer unit B 125, and a control information memory 123.

The control information memory 123 has a logical track control table 127 for storing, by logical track unit, the control information for controlling the write data and the read data such as the position on the cache memory 126 at which the control unit A 121 writes the write data, the position on the cache memory 126 at which the control unit B 122 reads the read data and the number of the disk unit corresponding to the read data, as well as other control information stored therein.

When the format writing is instructed from the host unit, that is, when a command to update the control field is issued, the control unit A 121 determines the erase area and the data processing unit A 124 erases that area so that the data transfer to the cache memory 126 is ready. On the other hand, when the data is transferred from the cache memory 126 to the disk unit 13 without erasing on the data transfer unit A 124, the control unit B 122 determines the erase area and the data transfer unit B 125 erases that area so that the data transfer to the disk unit 13 is ready.

In the control unit 12 of the present embodiment, as shown in FIG. 2, an area 20 is provided in the logical track control table 127 to store an erase flag 21 indicating whether the erasing is required or not after the completion of the format writing for each logical track and position information 22 indicating the final format writing end block in each logical track. For the final format writing end position information 22, a value calculated based on the segment number of the record for the final format writing and the record length thereof is converted to a block number of a plurality of block numbers which constitutes the logical track on the cache memory and it is stored.

Figure 3A:
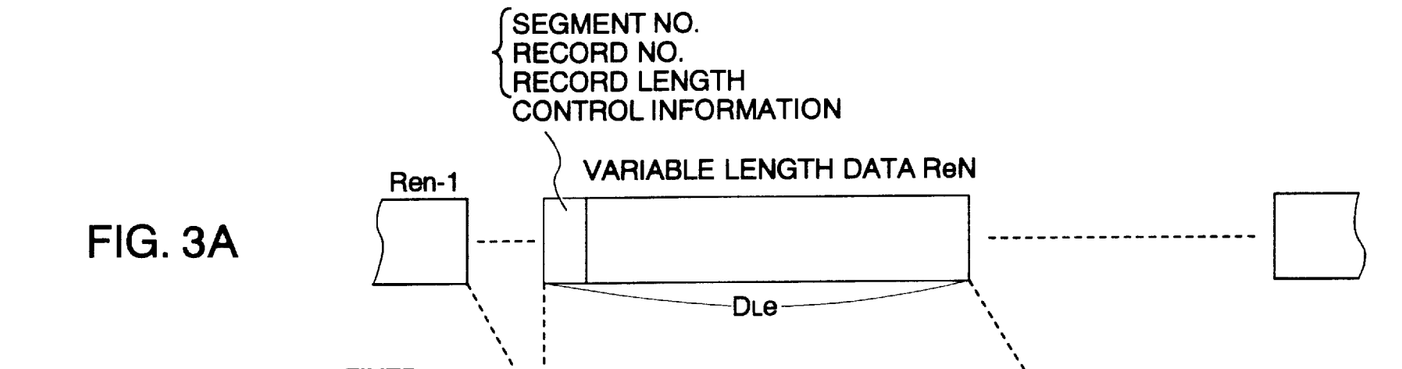
Figure 3B:
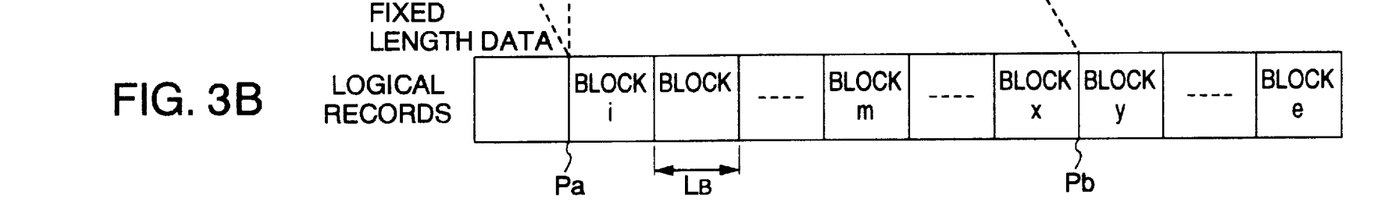

The correspondence between the variable length data shown in FIG. 3A and the fixed length data (corresponding to the logical track) shown in FIG. 3B when the former is converted to the latter is now explained. From the segment number of the control information of the variable length data (Ren), the position Pa (FIG. 3B) of the record on the logical track is determined. Assuming that the data (record) length is determined to be DLe from the record length of the control information, the data length DLe is divided by the length $L_B$ of one block (fixed length record) of the fixed length data to obtain the number of blocks (offset) of the fixed length data corresponding to the variable length data. Accordingly, by adding the end position of the previous variable length data (Ren-1) in the fixed length data shown in FIG. 3B, that is, the number of blocks $DLe/L_B$ derived for the head position (block number) of the current variable length data Ren, the writing end position (block number x) Pb of the variable length data Ren is obtained. When the variable length data Ren is the write data corresponding to the finial format writing command, the derived block number Pb represents the final writing end block. Accordingly, the block number x is stored as the final format writing end position information of the control table 127 of the corresponding logical track number. Accordingly, blocks y~e are erase area.

The fixed length data block i represents the data transfer start block number of the final format writing record.

FIG. 4A shows an example of data record format on the cache memory in the present embodiment. The cache memory 126 is controlled by dividing it into a plurality of logical tracks and each track n comprises a plurality of blocks 30. Each track is assigned with a track number in an ascending order from the top as shown in FIG. 4B. The blocks 30 (blocks y~e) immediately after the final format writing end block (the block x in the present example) in the logical track are contained in the erase area 31. The control unit A 121 compares the final format writing end position information 22 of the logical track with the final block numbers in the blocks of the logical track on the cache memory and if they do not match, the erase flag 21 is set to "1".

The operations of the units in the erasing process after the format writing are now explained.

When a format writing command is issued from the processing unit 10 and the write data is transferred to the control unit 12 through the channel 11, the control unit A 121 in the control unit 12 recognizes the logical track number from the control information at the top of the record to determine whether the corresponding logical track control table 127 is present or not. If the corresponding logical track control table 127 is not present, a new logical track control table 127 is prepared and a plurality of blocks on the cache memory 126 which can store the entire logical track including the write data are secured. The control unit A 121 calculates the data transfer start block number from the segment number of the record which is the subject of the format writing. On the other hand, if the corresponding logical track format table 127 is present, the blocks on the cache memory are not secured and the data transfer start block number is immediately calculated.

Then, the control unit A 121 commands to the data transfer unit so that the data transfer unit A 124 inputs the write data from the channel 11 and then sequentially transfers the input write data from the position of the calculated data transfer start block number. If the next format writing command is chained to the above format writing command, the control unit A 121 calculates the data transfer start block number from the segment of the record which is the subject of the next format writing and sequentially transfers the data to the cache memory 126 from the position of the block number. When a plurality of format writing commands are serially chained, the same process is repeated. When the format writing command of the channel 11 terminates, the control unit A 121 calculates the offset of the block number from the record length of the record which is the subject of the final format writing, adds it to the data transfer start block number of the record which is the subject of the final format writing and stores it as the final format writing end position information (block number) 22. The control unit A 121 compares the final format writing end position information (block number) 22 of the logical track for which the format writing has been performed with the final block number (end block number of the logical block) of the blocks forming the corresponding logical track on the cache memory, and if they do not match, the erase flag 21 is set to "1".

The operation when the control unit A 121 or B 122 attempts to write the data of a logical track from the cache memory 126 to the disk unit 13 is now explained. The control unit B 122 first determines whether the data of the logical track requires the erasing after the format writing or not by referring the erase flag 21 in the logical track control table 127 corresponding to the logical track. If the erase flag 21 is on, the control unit A 121 or B 122 refers the final format writing end position information 22 in the corresponding logical track control table 127 and transfers the data from the top position of the logical track to the final format writing end position (i.e. the data in the valid area) from the cache memory 126 to the disk unit 13, and the control unit B 122 sets the erase data (for example, NULL data) on the data transfer unit B 125 and transfers the erase data of the volume from the block immediately after the position indicated by the final format writing end position information 22 derived by referring the table 127 to the final block, to the disk unit 13.

Instead of the above method, the erasing may be performed in the following manner. Namely, the control unit B 122 sets the erase data on the data transfer unit B 122 and transfers the data from the block immediately after the position indicated by the final format writing end position information 22 to the final block number and writes the data from the block immediately after the final format writing end position of the corresponding logical track to the end block. Then, the data of the logical track from the cache memory 126 from the top of the track to the end block is transferred to the disk unit 13 through the data transfer unit B 125 to perform the erasing.

In this manner, the control unit 122 prepares the erase data asynchronously with the data transfer from the cache memory 126 to the disk unit 13 and transfers it to the cache memory 126, and then the data is transferred from the cache memory 126 to the disk unit 13.

FIGS. 5 and 6 show flow charts of the above operations. In FIG. 5, when a command is issued from the processing unit 10, the control unit 121 includes a step 400 for determining whether the command is the format writing command or not, a step 401 for recognizing, if the decision in the step 400 is YES, the logical track number from the control information at the top of the record by the control unit A121 of the control unit 12 and a step 402 for determining whether the logical track control table corresponding to the logical track number is present or not. It further includes a step 403 for preparing, when the decision in the step 402 is NO, the logical track control table, a step 404 for securing blocks on the cache memory for writing the data, a step 405 for calculating the transfer start block number on the cache memory 126 at which the write data transfer is started from the segment number of the record which is the write data, a step 406 for inputting the write data from the processing unit 10 to the data transfer unit A 124 and a step 407 for transferring the write data inputted to the data transfer unit A 124 to the cache memory 126 and writing it from the starting transfer start block determined in the step 405. It further includes a step 408 for determining whether the next instruction from the processing unit 10 is the format writing command or not, a step 409 for storing, when the decision in the step 408 is NO, the final format writing end position information 22, a step 410 for comparing the final format writing end position information 22 stored in the step 409 with the end block number in the logical track of the blocks 30 forming the logical track on the cache memory, a step 411 for setting the erase flag to "1" when the decision in the step 410 is mismatch and a step 412 for setting the erase flag to "0" when the decision in the step 410 is match.

The method for determining whether the format writing command is the final format writing command or not is described below. In the step 407 of FIG. 5, the control unit 121 transfers the data to the cache memory 126 and then informs the completion of the data transfer to the processing unit 10. Then, of the next command sent from the processing unit 10 is not the format writing command, it is determined that the previous (in the step 400) format writing command from the processing unit 10 is the final format writing command and the final format writing end position is stored in the control table 127 in the step 409.

FIG. 6 comprises a step 50 for determining whether the control unit A 121 or B 122 commands by itself to write data of a logical track from the cache memory 126 to the disk unit 13 or not, a step 51 for referring, when the decision in the step 50 is YES, the logical track control table of the logical track to be written into the disk unit 13, a step 52 for determining whether the erase flag referred in the step 51 is on or not, a step 53 for transferring, when the decision in the step 52 is YES (flag is on), the data from the top position of the logical track to the final format writing end position referred in the step 51, to the disk unit 13, a step 54 for setting the erase data on the data transfer unit B 125 and a step 55 for transferring the data from the block immediately after the final format writing end position information 22 referred in the step 51 to the end block, to the disk unit 13. FIG. 5 is for the processing by the processing unit A 121 and FIG. 6 is for the processing by the processing unit B 122.

When the step 52 determines that the erase flag is off, the normal data processing is performed. Namely, the data from the top position of the logical track to the end position is transferred from the cache memory to the disk unit.

The operation of the units when the reading and the writing of only the data in the valid area are permitted is now explained.

When an access request such as a read request for data in a logical track or a write request without accompanying the format writing is issued from the processing unit 10 to the control unit, the control unit A 121 recognizes the logical track number from the access information from the processing unit 10 and determines whether the logical track control table 127 corresponding to the logical track is present in the control information memory 123 or not. If it is not present, it does not correspond to the operation of the present embodiment and the explanation thereof is omitted. When the logical track control table 127 of the logical track is present, the erase flag 21 on the logical track control table 127 is referred, and if the flag is on, the final format writing end position information 22 on the logical track control table 127 is referred. The reverse conversion of the final format writing end position information 22 into the segment number is compared with the segment number of the access field which is determined based on the access information from the processing unit 10. If the segment number of the access field is smaller than the segment number representing the final format writing end position, that is, if the access field is present before the final format writing end position (toward the top of the logical track), the presence of the record is reported and the access is granted. Otherwise, the absence of the record to be accessed is reported to the processing unit 10 and the access of the block in the area indicated by the segment number to be accessed designated by the access information is not granted.

This is shown in a flow chart of FIG. 7. FIG. 7 comprises a step 60 for recognizing the logical track number for the access from the access information from the processing unit 10, a step 61 for determining whether the logical track control table 127 corresponding to the logical track recognized in the step 60 is present or not, a step 62 for determining, when the decision in the step 61 is YES, whether the erase flag 21 is on or not, a step 63 for determining, when the decision in the step 62 is YES, whether the final format writing end position is after the position of the record to be accessed by the access information from the processing unit 10 or not, a step 64 for reporting, when the decision in the step 63 is YES, the presence of the record to be accessed to the processing unit 10 and granting the access request and a step 65 for reporting, when the decision in the step 63 is NO, the absence of the record to be accessed to the processing unit and not granting the access request.

In accordance with the present embodiment, the erase flag 21 and the final format writing end position information 22 are provided for each logical track in the logical track control table 127 which is set by the logical track unit of the cache memory 126, and for the writing or addition of the new record which accompanies with the format writing to the logical track, only the updating of the final format writing end position information 22 indicating the valid area of the data in the logical track and the erase flag 21 indicating the need for the erasing are needed and the erasing is not performed. When the writing is made from the cache memory 126 to the disk unit 13 by the logical track unit, the erase flag 21 corresponding to the logical track is referred and the erasing is performed only when it is needed. Accordingly, when the disk unit 12 which records the data in the fixed record length format is connected to the control unit 12 in the system including the processing unit 10 which handles the data of the variable record length format, the erasing area and the number of times of execution can be minimized.

For the access request such as the updating or reading of the existing record on the logical track which does not accompany with the format writing, the segment number designated by the access request is compared with the final format writing end position information 22 and the access to the invalid area from the position indicated by the final format writing end position information 22 in the logical track to the track end is rejected so that the erroneous operation of reading the data which is to be erased or handling it as the data to be overwritten is prevented.

Since the number of logical track control tables 127 is at most as many as the number of logical tracks present in the cache memory 126, the capacity of the control information memory 123 in which the logical track control table 127 is set may be saved compared to when the information for controlling the erasing for the track of the disk unit 13 is provided as it is in the prior art.

While the preferred embodiment of the present invention has been described specifically, it should be understood that the present invention is not limited to the above embodiment and various modifications thereof may be made without departing from the spirit of the invention.

For example, in the present invention, the position information in the logical track handled in the control unit is not limited to the segment number and the block number shown in the embodiment but the data length per se may be used.

In accordance with the control method for the external storage subsystem of the present invention, the area of the erasing and the number of times of execution are minimized and the throughput of the data transfer between the processing unit and the rotating storage device is improved.

In accordance with the control method for the external storage subsystem of the present invention, the area of the erasing and the number of times of execution are minimized without sacrificing the reliability of data and operation and the throughput of the data transfer between the processing unit and the rotating storage device is improved.

In accordance with the control method for the external storage subsystem of the present invention, the area of the erasing and the number of times of execution are minimized with less resources and the throughput of the data transfer between the processing unit and the rotating storage device is improved.

In accordance with the control apparatus for the external storage subsystem of the present invention, the area of the erasing and the number of times of execution are minimized and the throughput of the data transfer between the processing unit and the rotating storage device is improved.

In accordance with the control apparatus for the external storage subsystem of the present invention, the area of the erasing and the number of times of execution are minimized without sacrificing the reliability of data and operation and the throughput of the data transfer between the processing unit and the rotating storage device is improved.

In accordance with the control apparatus for the external storage subsystem of the present invention, the area of the erasing and the number of times of execution are minimized with less resources and the throughput of the data transfer between the processing unit and the rotating storage device is improved.

What is claimed is:

1. In an external storage subsystem comprising a rotating storage device and a control unit provided between said rotating storage device and a host processing unit, said control unit including a cache memory for temporarily holding data transmitted and received between said processing unit and said rotating storage device, said cache memory having a memory area in a form of a plurality of logical tracks corresponding to logical tracks of said rotating storage device;

a method for controlling data transfer performed by said control unit comprising the steps of:
 a) writing write data transferred from said processing unit and to be transferred to said rotating storage device to logical tracks of said cache memory corresponding to the write data;
 b) for each of the logical tracks of the cache memory having the write data written thereon,
  1) storing an end position of valid write data in the logical track to a control memory in said control unit; and
  2) setting a flag indicating whether an erasing is required or not in transferring the write data read from each of said logical tracks to said rotating storage device in said control memory based on the end position of the valid write data in each logical track and the end position in each logical track; and
 c) in reading the write data from each of the logical tracks of said cache memory, referring to the flag of said control memory corresponding to the one logical track of said cache memory and performing said erasing when the referred flag indicates that the erasing is required.

2. A method for controlling data transfer according to claim 1 further comprising the step of:
 d) upon reading the write data from one of the logical tracks of said cache memory by referring to the end position of the valid write data in one of said logical tracks in said control memory, reading the data from the top position to the end position of the valid write data in one of the logical tracks and transferring the data thus read to said rotating storage device
wherein
 specified data of the volume equal to the data from the position immediately after the end position of the valid write data to the end position in one of the logical tracks in said step c) is transferred to said rotating storage device as erase data to perform the erasing.

3. A method for controlling data transfer according to claim 1 wherein said step b)2) sets a flag indicating that the erasing is required or not required in reading the write data in each of the logical tracks when the end position of the valid write data in each logical track and the end position of each logical track match or mismatch, respectively.

4. A method for controlling data transfer according to claim 1 further comprising a step of:

when an access request requesting updating or reading of data for the data of one of the logical tracks of said cache memory is issued from said processing unit to said cache memory, granting the access request only when the position of the data to be accessed in the one logical track designated by the access request is located toward the top of the one logical track relative to the end position of the valid write data in the one logical track of said cache memory.

5. A method for controlling data transfer according to claim 2 further comprising a step of:

when an access request requesting the updating or the reading of data for the data of one of the logical tracks of said cache memory is issued from said processing unit to said cache memory, referring the flag of said control memory corresponding to said one logical track and granting the access request when the referred flag indicates that the erasing is not required.

6. A method for controlling data transfer according to claim 1 wherein said step b)1) stores the end position of the final format writing data in the logical track corresponding to the write data in said control memory as the valid write data end position.

7. A control unit provided between at least one processing unit and at least one rotating storage device for storing data in a fixed length format and converting data in a variable length format transferred from said processing unit to data in the fixed length format for transfer to said rotating storage device, comprising:

a cache memory for temporarily holding the data transmitted and received between said processing unit and said rotating storage device and having a memory area having a plurality of logical tracks corresponding to logical tracks of said rotating storage device;

a control memory for storing information for each of the logical tracks of said cache memory;

means, when data from said processing unit accompanies with format data writing, for storing an end position of final write data in the logical track in said cache memory in which said data is stored into said control memory as said information;

flag setting means for setting in said control memory as said information a flag indicating whether an erasing is required or not in transferring the data read from the logical track of said cache memory to said rotating storage device based on the end position of the final format writing data and the end position of each logical track of the logical tracks of said cache memory having the data accompanied by the format writing written thereon;

transfer means including discrimination means, in reading data from one of the logical tracks of said cache memory, for referring the flag of the control memory corresponding to said one logical track of said cache memory to determine whether the referred flag indicates that the erasing is required or not; and erase means for performing the erasing when said discrimination means determines that the referred flag indicates that the erasing is required.

8. An apparatus for controlling data transfer according to claim 7 wherein:

said transfer means, upon reading data from one of the logical tracks of said cache memory by referring to the end position of the final format writing data in said one logical track in said control memory, reads the data from the top position to the end position of the final format writing data in said one logical track and transfers the data to said rotating storage device; and said erase means transfers to said rotating storage device specified data of a volume from the end position of the final format writing data to the end position of said one logical track as the erase data to perform the erasing.

9. An apparatus for controlling data transfer according to claim 8 wherein said flag setting means sets a flag indicating that the erasing is required or not in reading the data in each logical track when the end position of the final format writing data of each logical track and the end position of each logical track match or do not match, respectively.

10. An apparatus for controlling data transfer according to claim 7 further comprising:

means for, when an access request for requesting updating or reading without accompanying format writing or read-out data as to data of one of the logical tracks of said cache memory is issued from said processing unit to said cache memory, granting said access request only when the data of said one of the logical tracks designated by the access request is located toward the top of said one of the logical tracks relative to the end position of the final format writing data in said one of the logical tracks.

11. An apparatus for controlling data transfer according to claim 8 further comprising:

means for referring to the flag of said control memory corresponding to said one logical track and granting an access request for requesting updating or reading without accompanying format writing or read-out data as to data of one of the logical tracks of said cache memory issued from said processing unit to said cache memory when the referred flag indicates that the erasing is not required.

12. An external storage subsystem comprising:

at least one rotating storage device for storing data in a fixed length format; and a control unit provided between at least one processing unit and said at least one rotating storage device for storing data in a fixed length format and converting data in a variable length format transferred from said processing unit to data in the fixed length format for transfer to said rotating storage device;

said controlling unit including:

a cache memory for temporarily holding the data transmitted and received between said processing unit and said rotating storage device and having a memory area having a plurality of logical tracks corresponding to logical tracks of said rotating storage device;

means, when data from said processing unit accompanies with format data writing, for storing and end position of final write data in the logical track in said cache memory in which said data is stored into said control memory as said information;

flag setting means for setting in said control memory as said information a flag indicating whether an erasing is required or not in transferring the data read from the logical track of said cache memory to said rotating storage device based on the end position of the final format writing data and the end position of each logical track of the logical tracks of said cache memory having the data accompanied by the format writing written thereon;

transfer means, including discrimination means, in reading data from one of the logical tracks of said cache memory, for referring the flag of the control memory corresponding to said one logical track of said cache memory to determine whether the referred flag indicates that the erasing is required or not; and erase means for performing the erasing when said discrimination means determines that the referred flag indicates that the erasing is required.

13. An external storage subsystem according to claim 12 wherein:

said transfer means, in reading data from one of the logical tracks of said cache memory, refers to the end position of the final format writing data in said one logical track in said control memory and reads the data from the top position to the end position of the final format writing data in said one logical track for transfer to said rotating storage device; and said erase means transfers to said rotating storage device specified data of the volume from the end position of the final format writing data to the end position of said one logical track as the erase data to perform the erasing.

* * * * *